(12) United States Patent
Shu et al.

(10) Patent No.: US 7,927,398 B2
(45) Date of Patent: Apr. 19, 2011

(54) MULTISTAGE ELECTROMAGNETIC PURIFICATION METHOD FOR MOLTEN METAL

(75) Inventors: Da Shu, Shanghai (CN); Jun Wang, Shanghai (CN); Haiyan Chen, Shanghai (CN); Baode Sun, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 484 days.

(21) Appl. No.: 11/996,831

(22) PCT Filed: Sep. 29, 2005

(86) PCT No.: PCT/CN2005/001618
§ 371 (c)(1),
(2), (4) Date: Jan. 25, 2008

(87) PCT Pub. No.: WO2007/012231
PCT Pub. Date: Feb. 1, 2007

(65) Prior Publication Data
US 2008/0216601 A1 Sep. 11, 2008

(30) Foreign Application Priority Data
Jul. 28, 2005 (CN) .......................... 2005 1 0028221

(51) Int. Cl.
*C22B 9/22* (2006.01)
*C22B 9/02* (2006.01)
(52) U.S. Cl. ... 75/10.14; 75/10.67; 75/407; 210/748.01; 210/767; 204/557

(58) Field of Classification Search ................. 75/10.67, 75/10.14, 407–412; 210/748.01, 767; 204/557
See application file for complete search history.

(56) References Cited

U.S. PATENT DOCUMENTS
2007/0022841 A1* 2/2007 Todaro et al. ................... 75/407

FOREIGN PATENT DOCUMENTS
| CN | 1363699 A | 8/2002 |
| JP | 6-000597 A | 1/1994 |
| JP | 7-166253 A | 6/1995 |

* cited by examiner

*Primary Examiner* — George Wyszomierski
*Assistant Examiner* — Tima M McGuthry-Banks
(74) *Attorney, Agent, or Firm* — Lucas & Mercanti, LLP

(57) ABSTRACT

A multistage electromagnetic purification method of molten metal, which employs a multistage separator composed of two or more multichannel straight-pass separators bonded together with inorganic high-temperature adhesive. Each stage of the separators is set up in such a manner that the region of centerline of each channel in the former separators is occupied by the sidewall of the next separators at the corresponding position therein; while simultaneously the position in the next separators becomes a region close to sidewall. The multistage separator eliminates the "dead zone" of electromagnetic separation, realizes the transformation from "weak zone" to "strong zone" of electromagnetic separation, and significantly increases removal efficiency of inclusions in the melt with great volume under the effect of induced magnetic field.

7 Claims, 5 Drawing Sheets

MULTISTAGE ELECTROMAGNETIC PURIFICATION METHOD FOR MOLTEN METAL

BACKGROUND OF THE INVENTION

1. Field of the Invention

The present invention is addressed to the removal of nonmetallic inclusions from molten metal and more particularly a multistage-electromagnetic purification method of molten metal, which relates to the field of casting technique.

2. Background

Nonmetallic inclusions present in molten metal, which are deleterious to the mechanical properties, structural integrity, machinability and surface quality of products made from the metal, should be removed prior to casting. Ceramic foam filters (CFFs) are commonly used in casthouses, but with low filtration efficiency and unstable performance. Deep bed filters or particle bonded filters have better performance than CFFs, but with high costs and maintenance difficulty. Moreover, pore size of all kinds of filters should be greatly decreased in order to capture micro-sized inclusions, however, accompanying with low penetration, high flow resistance and early blockage problem. By contrast, electromagnetic separation is a novel method for inclusion removal to meet the growing demand for cleaner metals. It makes use of the difference in electrical conductivity between inclusions and the melt, and inclusions are separated outwards and captured by the sidewall if electromagnetic force field is exerted directly or generated by induction in the melt enclosed in a separator pipe. Due to high efficiency of electromagnetic separation, the channel size of separator can be much larger than that of filter pores without sacrificing the capability of capturing micro-sized inclusions. Therefore, electromagnetic separation has higher inclusion removal efficiency than filtration, while electromagnetic separator has less flow resistance and longer life period of use than filters.

China Pat. No. 01,142,619.5, issued to Shu D. et al. on Oct. 6, 2004, discloses a method for removal of nonmetallic inclusions from aluminum melt by use of an induction coil and a ceramic separator with square channels, wherein the channel size of the separator can be enlarged to sustain high removal efficiency of micro-sized inclusions because the induced secondary flow of the melt helps transport the inclusions from inner region to the outside skin layer in the cross section. However, the described ceramic separator is a single-stage type with open channels, i.e., there are no changes in the shape and size of the cross section along the flowing direction. It is well known that electromagnetic force distributes unevenly inside the melt for inductive separators, generally decaying exponentially in the radial direction from the outer wall to the center in the cross section. Consequently, the central region of a single-stage separator is a "weak zone" for electromagnetic separation, because inclusions located in this zone migrates slowly towards the outer sidewall, especially in the case of a large-sized separator. Besides, the melt at the centerline of the separator is not subject to electromagnetic force by theory. As a result, inclusions located there cannot be separated, causing the existence of "dead zone".

The existence of "weak zone" and "dead zone" of electromagnetic separation in a single-stage separator greatly hinders further increase of inclusion removal efficiency from bulk melt of high flow rates.

SUMMARY OF THE INVENTION

Accordingly, the object of this invention is to provide a novel method by using a multistage separator instead of a single-stage one to improve inclusion removal efficiency from bulk melt with the imposition of inductive magnetic field, which is designed to be able to eliminate the "dead zone" of electromagnetic separation and realize the transformation from "weak zone" to "strong zone" of electromagnetic separation.

The present invention provides a multistage separator to substitute for the single-stage one, which is made from ceramic material that has good wettability with nonmetallic inclusions and corrosion resistance to molten metal. The multistage separator is composed of two or more multichannel straight-pass separators bonded together with inorganic high-temperature adhesive. Each stage of the separators should be set up in such a manner that the region of centerline of each channel in the former separator is occupied by the sidewall of the next separator at the corresponding position therein, simultaneously the position in the next separator, which is corresponding to the central region of the channel in former separator, becomes a region close to sidewall.

The configuration of the multistage separator can be obtained either by rotating the neighboring multichannel straight-pass separator of same structure and size so that the channels in the former and next separator are interlaced, or by altering the channel size of the next separator to divide one channel of the former separator into multi sub-channels in the next separator.

By using a multistage separator, inclusions located at the centerline of the former separator are captured exactly by sidewall in the next separator, while those located in the central region of the former separator, which becomes a region close to sidewall, are separated outwards simultaneously in the next separator. As a result, the "dead zone" of electromagnetic separation in a single-stage separator is eliminated, and the transformation from "weak zone" to "strong zone" of electromagnetic separation is realized.

The inductive magnetic field referred in the present invention is either an axial alternating magnetic field generated by a solenoid coil, or a traveling magnetic field perpendicular to the flowing direction of molten metal generated by a linear motor.

The method of present invention improves the separation efficiency of nonmetallic inclusions by 20% or above, which employs a multistage separator instead of a single-stage one, when molten metal flows continuously through the separators under the same conditions of magnetic field and flow rates.

DETAILED DESCRIPTION OF EMBODIMENTS

The invention will be better understood with the aid of the following description in connection with the accompanying drawings.

Figure 1:
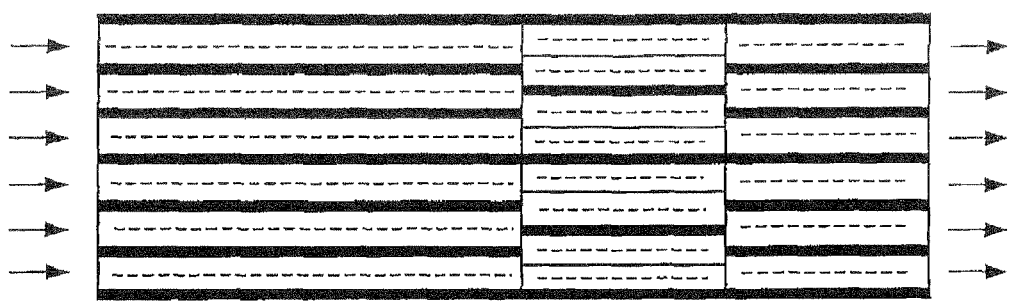
FIG. 1 is a longitudinal sectional view of a ternary-stage separator obtained by rotating multichannel straight-pass separators of same structure and size.
Figure 2:
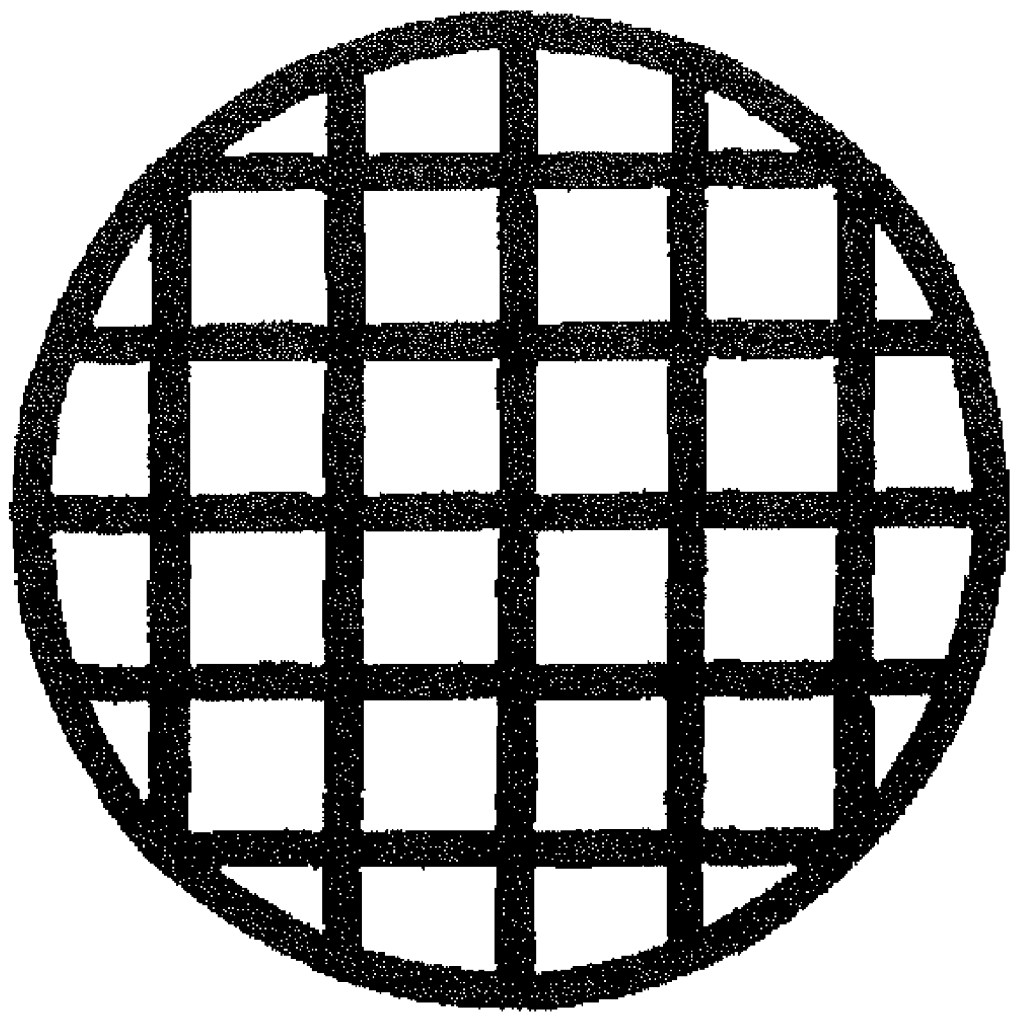
FIG. 2 is a cross sectional view of a single-stage separator.

Embodiment 1: As shown in FIG. 1 and FIG. 2. A ternary-stage separator is composed of three multi square channel straight-pass separators of same cross section, wherein the second-stage separator rotates by 45 degree clockwise to connect with the first and third-stage one. The cross sectional size of each square channel is 10 mm×10 mm. The length of the first-stage separator is 200 mm, while that of the second and third-stage one is 50 mm. As compared with a single-stage multi square channel separator of 300 mm in length, the separation efficiency of nonmetallic inclusions increased by 30% when molten metal flowed through the electromagnetic separator at a rate of 20 mm/s.

Figure 3:
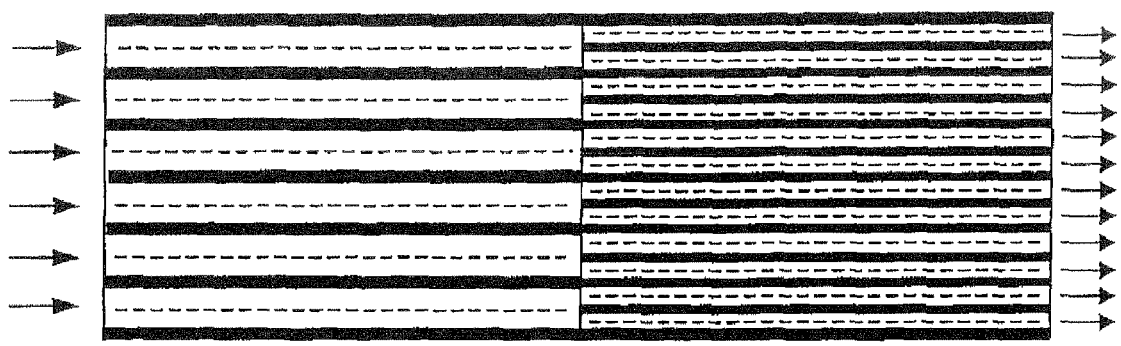
FIG. 3 is a longitudinal sectional view of a dual-stage separator obtained by altering channel size of neighboring separators.
Figure 4:
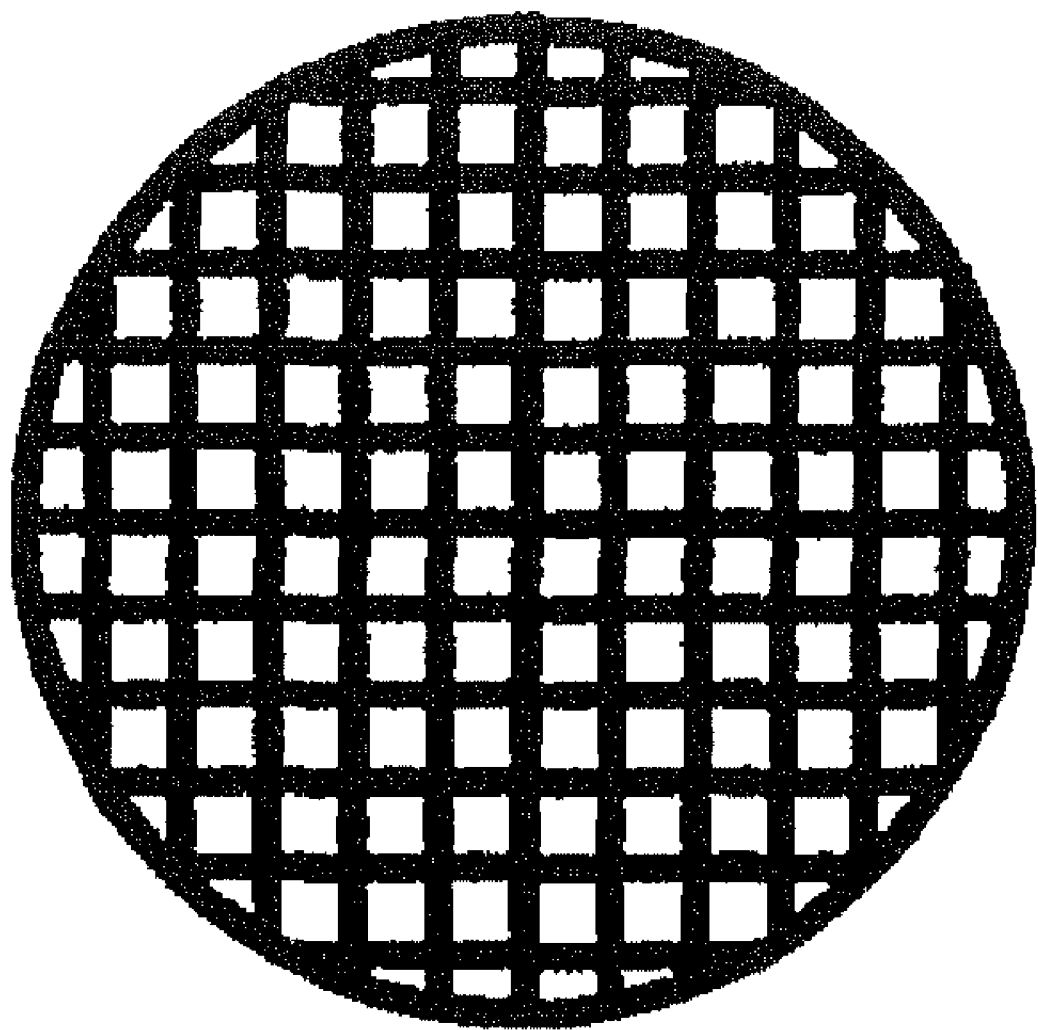
FIG. 4 is a cross sectional view of the second-stage separator.

Embodiment 2: As shown in FIG. 3 and FIG. 4. The cross sectional size of each square channel of the first and second-stage separator are 10 mm×10 mm and 5 mm×5 mm, respectively. The length of both separators is 150 mm. As compared with a single-stage multi square channel separator of 300 mm in length, the separation efficiency of nonmetallic inclusions increased by 20% when molten metal flowed through the electromagnetic separator at a rate of 20 mm/s.

Figure 5:
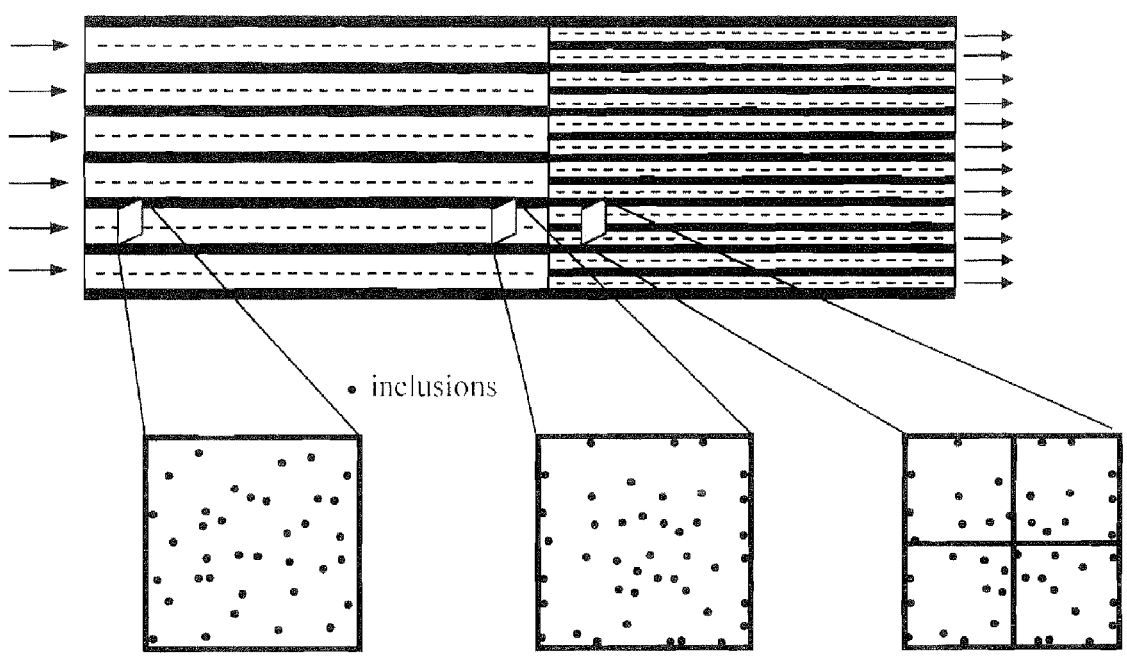
FIG. 5 is the principle view of the method of present invention

The principle of the present invention is shown in FIG. 5. When molten metal enters the first-stage separator, the inclusions located in the outer region will migrate to the sidewall quickly due to the electromagnetic separation effect while those located in the central region will remain stagnant. Assuming inclusions distribute randomly at the inlet, the distribution of inclusions at the end of the first-stage separator will exhibit the following character: excessive inclusions in the central region and low inclusion concentration near the sidewall. Thereafter, molten metal flows into the second separator. The region of centerline of each channel in the first-stage separator is exactly occupied by the sidewall of the second-stage separator at the corresponding position therein, simultaneously inclusions located in the "weak zone" of the first-stage separator are in the "strong zone", which is close to sidewall, of the second-stage separator. Thus, separation efficiency of inclusions improves significantly.

What is claimed is:

1. A multistage electromagnetic purification method for molten metal comprising the steps of:
    passing a molten metal having inclusions through a multistage separator,
        wherein the multistage separator comprises two or more multichannel straight-pass separators bonded consecutively with inorganic high-temperature adhesive,
        wherein each channel in each of the multichannel straight-pass separators is a square channel having a specific size, a central region and a sidewall region,
        a first of the multichannel straight-pass separators is bonded to a second of the multichannel straight-pass separators so that inclusions from the molten metal occupy the central region of each channel in the first of the multichannel straight-pass separators, passing to occupy the sidewall region of each channel in the second of the multichannel straight-pass separators;
    separating the inclusions from molten metal; and
    obtaining a purified molten metal.

2. The method of claim 1, wherein the configuration of the multistage separator is obtained either by rotating neighboring multichannel straight-pass separators of same structure and size so that the channels in the first and second of the multichannel straight-pass separators are interlaced, or by altering the channel size of the second of the multichannel straight-pass separators to divide one channel of the first of the multichannel straight-pass separators into multi sub-channels in the second of the multichannel straight-pass separators.

3. The method of claim 2, wherein the multistage separator further comprises a third of the multichannel straight-pass separators and the inclusions located at the central region of the first of the multichannel straight-pass separators are captured by the sidewall region in the second of the multichannel straight-pass separators, while those located in the central region of the second of the multichannel straight-pass separators becomes a region close to the sidewall and are separated outwards simultaneously in the third of the multichannel straight-pass separators.

4. The method of claim 2, wherein the multistage separator is made from ceramic material that has good wettability with nonmetallic inclusions and corrosion resistance to molten metal.

5. The method of claim 1, wherein the multistage separator further comprises a third of the multichannel straight-pass separators and the inclusion located at the central region of the first of the multichannel straight-pass separators are captured by the sidewall region in the second of the multichannel straight-pass separators, while those located in the central region of the second of the multichannel straight-pass separators becomes a region close to the sidewall and are separated outwards simultaneously in the third of the multichannel straight-pass separators.

6. The method of claim 1, wherein the multistage separator is made from ceramic material that has good wettability with nonmetallic inclusions and corrosion resistance to molten metal.

7. The method of claim 1, wherein an inductive magnetic field is imposed which is either an axial alternating magnetic field generated by a solenoid coil, or a traveling magnetic field perpendicular to the flowing direction of molten metal generated by a linear motor.

* * * * *